United States Patent [19]

Meynard

[11] Patent Number: 4,481,245
[45] Date of Patent: Nov. 6, 1984

[54] METHOD OF ASSEMBLING BITUMINOUS SEALING ELEMENTS

[75] Inventor: Jean-Yves Meynard, Mondoubleau, France

[73] Assignee: Siplast, S.A., Paris, France

[21] Appl. No.: 435,973

[22] Filed: Oct. 22, 1982

[30] Foreign Application Priority Data

Oct. 26, 1981 [FR] France ................................ 81 20018

[51] Int. Cl.³ ........................ B32B 23/02; B32B 11/02
[52] U.S. Cl. .................................... 428/192; 156/157; 427/180; 427/211; 427/258; 428/194; 428/291; 428/341; 428/347; 428/426; 428/474.4; 428/500; 428/523
[58] Field of Search ................. 428/489, 347, 88, 192, 428/291, 194, 193, 341, 426, 474.4, 500, 523; 427/211, 258, 180; 156/157

[56] References Cited

U.S. PATENT DOCUMENTS

| 4,091,135 | 5/1978 | Tajima et al. ................... 428/489 X |
| 4,092,450 | 5/1978 | Haren ............................. 428/194 X |
| 4,374,687 | 2/1983 | Yamamoto ...................... 428/489 X |

*Primary Examiner*—Thomas J. Herbert
*Attorney, Agent, or Firm*—Weiser & Stapler

[57] ABSTRACT

Bituminous sealing elements comprise a visible part and a part which serves for assembly thereof so as to form a continuous membrane. The assembly part is a "jointing zone" formed on the stripped edge of an element on which the edge of the adjacent element is applied by overlapping. To protect this zone, confer thereon the required strength and allow sticking by means of hot bitumen, adhesive or by means of a blowlamp, a web of low-weight porous, volatile non woven fibers, is used buried in the binder of the welding strip.

9 Claims, 2 Drawing Figures

METHOD OF ASSEMBLING BITUMINOUS SEALING ELEMENTS

BACKGROUND OF THE INVENTION

Bituminous sealing materials are in general formed of two parts:
a part which will subsequently remain visible,
a part which will serve for assembling elements together so as to form a continuous membrane preventing water from entering.

The invention relates to protecting the part which serves for assembling elements together.

The part which serves for joining two separate elements together to form therefrom a continuous element will be called jointing zone in what follows.

A jointing zone has in general the same composition as the rest of the material, except that all the elements are removed therefrom which, considering the sealing means contemplated, may hinder use thereof and, if such be the case, elements promoting this use are added thereto.

For example, sealing materials proposed in rolls, comprise the sealing element itself, the surface protection against climatic agressions (UV, temperature, water, etc.) and the jointing zone formed on the edge of the sealing element.

The method for assembling bituminous material sealing elements in accordance with the invention is characterized in that, on the edge of an element, preferably stripped, forming the jointing zone there is placed a sheet of particular non-woven fibers on which is applied by overlapping the edge of the adjacent element.

The surface protection then appears continuous.

Sealing of the two elements together is achieved by any known means, such as hot bitumen, adhesive or by melting with a blowlamp provided for this purpose.

However, this jointing zone, before use, will have to be stored in rolls without the turns sticking together.

It will also have to be manufactured economically; since the price of sealing materials is low, many of the solutions used in the industry of permanent adhesives (labels and tapes, for example) are not easily usable.

The problem which arises for this jointing zone is: what type of protection to use on this jointing zone which does not hinder the final sealing but allows the sealing roll to be handled and stored without problems before sealing.

Finally, the jointing zone must be sufficiently crush-resisting for the roll of finished product will be stored on the jointing zone side.

Most of the solutions used are not technically perfect and/or economically viable. The following protections have thus been used:

Powdered silica or other powdered minerals such as talc, slate, etc. This very economical solution does not perform very well from the use point of view, since the mineral forms a screen. Furthermore, the stockability is not perfect for sticking between turns in hot weather is likely to occur.

Polyolefin films. This solution is economical and presents good protection against sticking between turns. Unfortunately, the material can only be sealed with a blowlamp and not with hot bitumen or adhesive, which considerably restricts use thereof.

Strippable protections, such as silicon coated paper and similar. This solution is perfect from the protection point of view, but not as good from the point of view of use for it requires the protection to be removed and destroyed. Moreover, it is not economical.

SUMMARY OF THE INVENTION

The invention consists in using, as protection for this jointing zone, a web of non woven fibers of very low-weight, porous and volatile.

This protection is deposited by machine on the part of the product which will serve as jointing zone, or by any other known means.

The non woven fibers will be preferably polyester or polypropylene fibers or of any other polyolefin.

The web will have preferably a weight of 15 to 25 g per $m^2$ or may drop to 8 to 10 g and go as high as 80 g.

This web will be pressed to a greater or lesser degree into the binder of the welding strip, the essential thing being that the surface of the web is flush with the binder so as to play the role of protection. This use of a non woven fiber is very different from their usual use as sealing product reinforcement.

The non woven fabric could also be, in a non limiting way, formed by glass fibers, polyvinyl alcohol fibers or alse polyamide fibers and generally from any other fiber capable of forming a screen between the superimposed edges of two jointing elements.

BRIEF DESCRIPTION OF THE DRAWINGS

There is shown in section in the accompanying drawing as FIG. 1, an assembly of bituminous sealing elements provided by a jointing zone in accordance with the invention and
as FIG. 2, the apparatus for producing same.

DESCRIPTION OF THE PREFERRED EMBODIMENT

On the edge of the tight element 1 is placed a strip of non-woven fiber 2 pressed to a greater or lesser degree into the binder which provided adhesion thereof under the edge of the adjacent element 3 covered with the protection material 4.

Such a jointing zone provides protection against sticking between the turns of the material rolls and confers on this zone resistance to crushing due to storage. It allows a sealed assembly to be obtained with the edge of the adjacent element placed thereon because it is porous and volatile and lets the hot bitumen or the bitumen with solvent pass or is volatalized by application of the blow-lamp.

Figure 1:
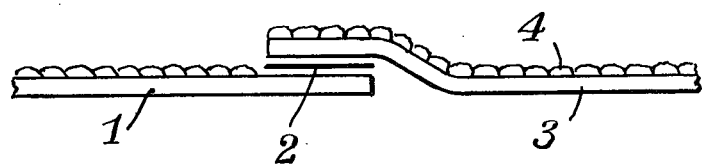
Figure 2:
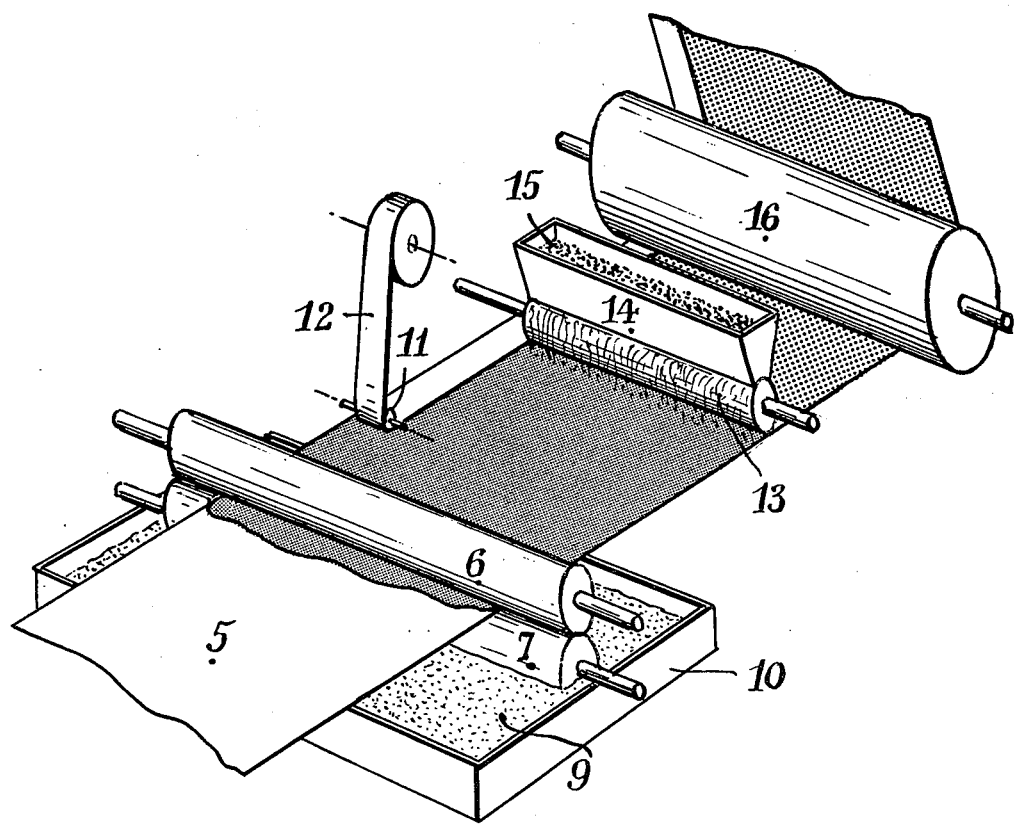

The manufacture of such a covering element may be achieved by means of the process described below using for this purpose the installation shown schematically in FIG. 2.

An appropriate backing 5, of the desired width, is conveyed longitudinally between two rollers 6 and 7 for spreading the bitumen, of which the lower roller 7 dips partially into a bath of bitumen 9, contained in tray 10, then the upper face of one of the two borders of this backing, completely coated with bitumen on both faces thereof is provided, by means of the small transverse rotary roller 11, with a strip 12 of non woven fibers; finally, another transverse roller 13, disposed under a bottomless trough 14 filled with a material 15 for protecting the upper face of the covering element, such as a granulated material for example, deposits over the whole width of the upper face of the sealing element between the non-woven material strip covering one of its borders and its opposite longitudinal edge, an appropriate layer of this protection material; the sealing covering element thus finished is conveyed longitudinally by another longitudinal roller 16 and may then be used or stored.

What is claimed is:

1. A sealing covering element constituted by a backing coated on both faces with bitumen and covered with a protection material, one edge of which is free of protection material and constitutes a jointing zone together with the opposed edge of the adjacent covering element, said opposed edge overlying said jointing zone so as to form, with an appropriate number of these elements of appropriate length, a sealing covering of the desired size, wherein said jointing zone is covered in the factory with a thin, porous and volatilizable web of non-woven fibers which is free of protection material whereby two adjacent elements by means of a solvent or a blowtorch can be joined together by positioning with overlap.

2. The sealing covering element as claimed in claim 1, wherein said porous and volatilizable web of non-woven fibers of the jointing zone weighs from 8 to 60 grams and preferably from 15 to 25 grams per $m^2$.

3. The sealing covering element as claimed in claim 1, wherein said web is made from porous and volatilizable glass fibers.

4. The sealing covering element as claimed in claim 1, wherein said web is made from polyvinyl alcohol fibers.

5. The sealing covering element as claimed in claim 1, wherein said web is made from fibers of the polyamide family.

6. The sealing covering element as claimed in claim 1, wherein said web is made from polyolefin fibers and particles of polypropylene.

7. A process for manufacturing a sealing covering element comprising the following steps
  (a) longitudinally conveying a backing between two superimposed transverse rotary rollers,
  (b) spreading a bitumen coating onto both faces of said backing,
  (c) applying onto one edge of the coated backing a strip of non-woven fibers by means of a small rotary transverse roller, and
  (d) depositing powdered protecting material onto the whole backing by means of a transverse roller except for that portion containing said strip of non-woven fibers.

8. The process of claim 7 wherein the non-woven fibers are in the form of a thin, porous and volatilizable web.

9. The process of forming a sealing cover utilizing the process of claim 8, which comprises the further steps of
  positioning two adjacent sealing elements with overlap in the region of the strip of non-woven fibers without having removed said strip, and
  uniting said overlapping elements by applying a solvent or a blowtorch to said overlap.

* * * * *